June 18, 1968     R. T. CORNELIUS ET AL     3,388,833
METHOD AND MEANS FOR DISPENSING COFFEE BEVERAGE
Filed Feb. 26, 1964     2 Sheets-Sheet 1
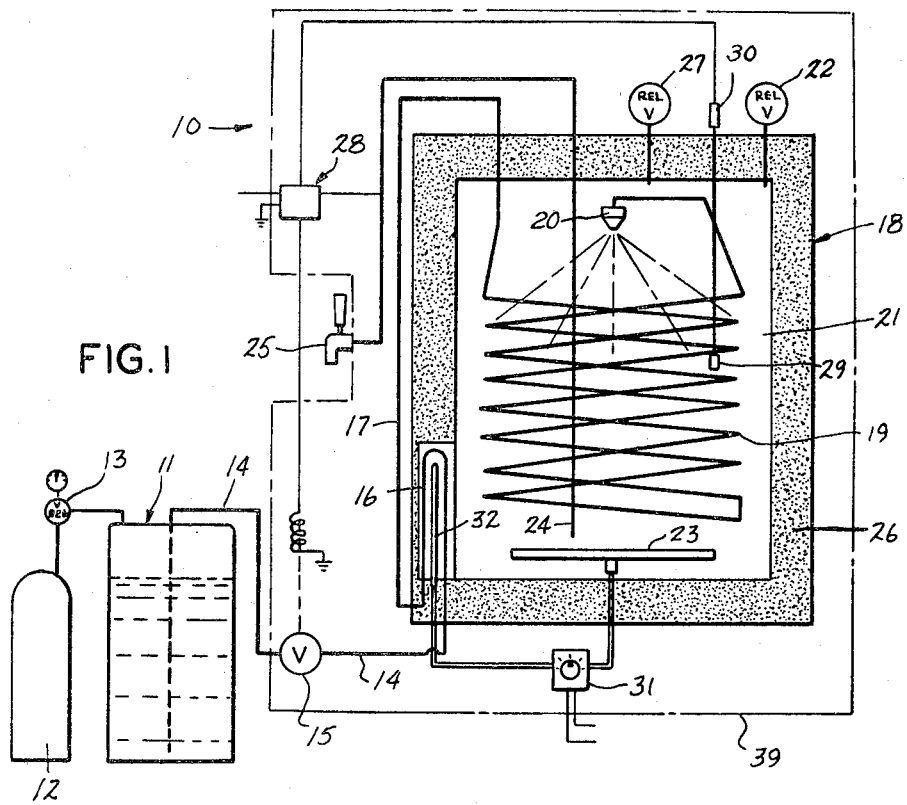
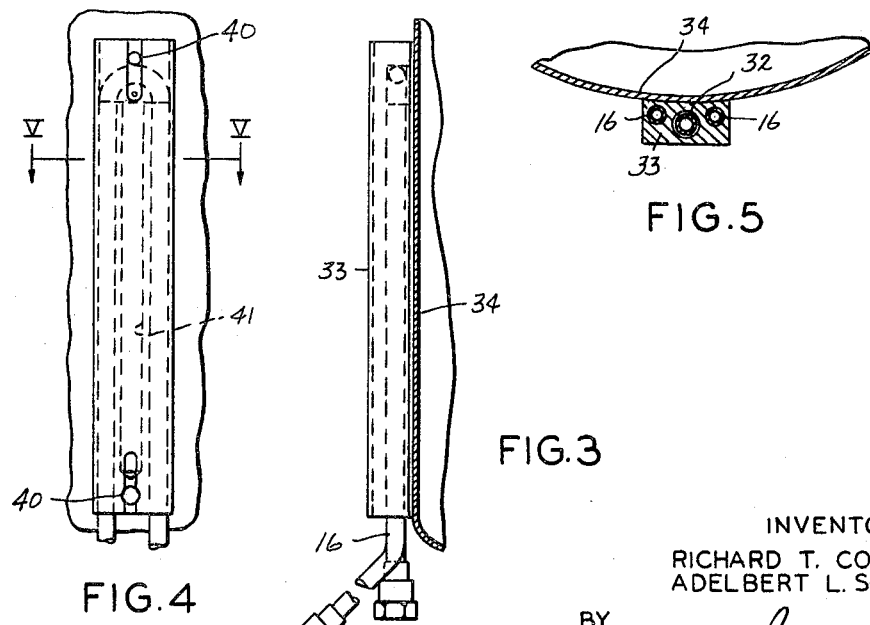
INVENTORS.
RICHARD T. CORNELIUS
ADELBERT L. SCHURMAN
BY
ATTORNEYS

United States Patent Office 3,388,833
Patented June 18, 1968

3,388,833
METHOD AND MEANS FOR DISPENSING COFFEE BEVERAGE
Richard T. Cornelius, Minneapolis, and Adelbert L. Schurman, Crystal, Minn., assignors to The Cornelius Company, Anoka, Minn., a corporation of Minnesota
Filed Feb. 26, 1964, Ser. No. 347,471
7 Claims. (Cl. 222—54)

ABSTRACT OF THE DISCLOSURE

Carbonated coffee beverage is conducted through a sensing coil and thence through a preheating coil and is discharged through a spray nozzle at the upper part of a depressurizing and heating chamber that effects decarbonation. The chamber is heated by an electrical heater carried by the bottom end thereof, the heater being under the control of a sensing element that is responsive to the temperature of the carbonated beverage in the sensing coil as well as the temperature of the chamber. Liquid level sensing means regulate a solenoid valve which controls the flow of unheated carbonated coffee beverage to the sensing coil. The preheating coil and the spray nozzle are carried by a removable cover.

---

This invention relates to a method and means for handling or dispensing a preserved coffee beverage.

It has been learned that by suitably carbonating a prepared coffee beverage, its keeping qualities are greatly extended. However, carbonated coffee beverage is considered as being unpalatable, and therefore before consumption, such carbonated beverage must be decarbonated, and preferably heated. This invention therefore deals with a method and means for handling, treating, storing, and dispensing such a preserved or carbonated coffee beverage, in which the coffee beverage is readied for imminent consumption by being decarbonated.

Accordingly, it is an object of the present invention to provide a method and means for dispensing coffee beverage.

Another object of the present invention is to provide a method and means for treating a coffee beverage.

Yet another object of the present invention is to provide a method and means for decarbonating a carbonated coffee beverage.

A still further object of the present invention is to provide a method and means of the type described in which beverage in a sensing coil is employed to lower the temperature of a thermal sensing element.

A still further object of the present invention is to provide a method and means of the type described in which a thermal sensing element is disposed in heat transfer relation with both a beverage sensing coil and a beverage chamber.

Another object of the present invention is to provide a method and means for decarbonating a carbonated coffee beverage in which the decarbonation is in at least part effected by spraying the carbonated coffee beverage.

Yet another object of the present invention is to provide a method and means for dispensing a coffee beverage in which beverage which is about to be added to a ready reserve is brought to a temperature substantially identical to that of such ready reserve prior to being added thereto.

A still further object of the present invention is to provide a combination of features suitably arranged so as to comprise apparatus specially adapted to dispense coffee beverage from a preserved supply thereof.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a diagrammatic view of a system for handling or treating and dispensing preserved coffee beverage, provided in accordance with the principles of the present invention;

FIG. 3 is an enlarged fragmentary detailed view of a portion of FIG. 2;

FIG. 4 is a side view of the structure shown in FIG. 3; and

FIG. 5 is a cross-sectional view taken along line V—V of FIG. 4.

As shown on the drawings:

Figure 2:
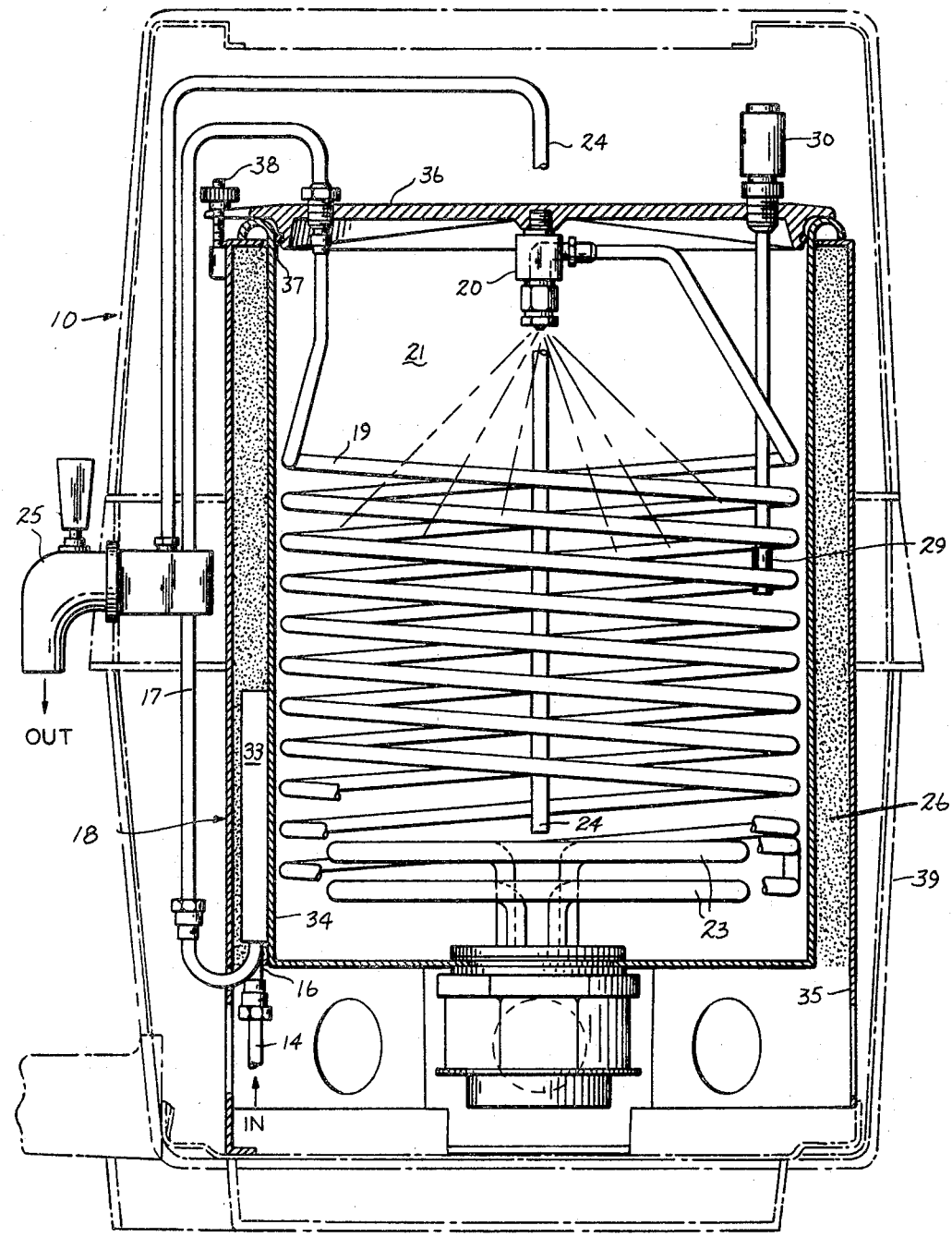
FIG. 2 is a cross-sectional view of coffee dispensing apparatus, the same comprising an embodiment of the diagrammatic representation of FIG. 1.

The principles of the present invention are particularly useful when embodied in a preferred form of coffee dispensing apparatus such as illustrated in FIG. 1, generally indicated by the numeral 10. The system includes a supply of carbonated coffee beverage generally indicated at 11, which is under a constant pressure of carbon dioxide gas provided from a source 12 and controlled by a suitable pressure-regulating valve 13. Not only does the carbon dioxide gas in the container 11 serve as a propellant, but it also serves to aid in the preservation of the carbonated coffee beverage disposed therein.

To ready the carbonated coffee beverage for imminent consumption, the carbonated coffee beverage is conducted by a line 14, the flow through which is under the control of an electrically actuated solenoid valve 15. In a preferred embodiment, the carbonated coffee beverage passes through a sensing coil 16 which is constructed to be of inverted U-shape, and then passes through a line 17 into a heatable decarbonator mechanism generally indicated at 18. The beverage on entering the mechanism 18 passes through a beverage preheating coil 19 which is connected at one end to the line 17, and which is connected at its opposite or discharge end to a spray nozzle 20 disposed in the upper end of a chamber 21.

The pressure in the supply tank 11 preferably comprises the carbonation pressure employed in the processing of the freshly prepared coffee beverage. This pressure is reduced along the flow path of the coffee beverage, and the chamber 21 is therefore maintained at a pressure which is somewhat less than that of the storage tank 11. Although this pressure is a reduced pressure, such pressure is slightly above atmospheric. To maintain such a pressure, there is provided a relief valve 22 which has a cracking pressure in the range between ½ and 5 p.s.i.

The decarbonator mechanism 18 includes an electric heater 23 supported by the lower end or wall of the mechanism 18, which heater 23 thus is in direct contact with coffee beverage disposed therein. So also, the beverage preheating coil 19 is immersed in such beverage and thus is in direct contact therewith.

When the pressure on the carbonated coffee beverage is reduced, as at the valve 15 and as at the spray 20, the carbonated beverage is rendered unstable, and carbon dioxide gas dissolved therein forms into bubbles which separate from the liquid in the chamber 21 and are vented to the atmosphere by the relief valve 22. The coffee beverage flowing through the beverage preheating coil not only has its temperature elevated to be the same as that of the beverage in the chamber, but also has its temperature elevated to render even more unstable the solution of the carbon dioxide gas therein. The spray nozzle 20 not only permits a pressure reduction, but also provides a mechanical agitation of the carbonated beverage, thereby further aiding in the rendering unstable of the carbon dioxide gas dissolved in the liquid.

The decarbonated beverage settles to the bottom of the chamber 21 owing to its heavier density, and its temperature is maintained by the heating element 23, such temperature being that at which it is desired to serve the decarbonated coffee beverage.

The slight pressure of carbon dioxide gas which is retained and maintained by the relief valve 22 over the liquid coffee beverage in the chamber 21 serves to preserve the decarbonated coffee temporarily, such as for two days, and also serves as a propellant in this embodiment. To withdraw ready coffee beverage, there is provided a pipe or dip-stick 24 which extends to a point near the bottom of the chamber 21, and which communicates at its opposite end with a conventional manually operated dispensing valve 25.

The decarbonator mechanism 18 includes a quantity of thermal insulation 26 which encloses at least the sides of the means which defines the chamber 21.

To prevent against an unwarranted pressure build-up in the chamber 21, a normally closed second relief valve 27 is provided, which typically is set to have a cracking pressure at about 10 p.s.i.

To maintain at least a minimum level of decarbonated coffee in the chamber 21, and to terminate admission of further coffee therein whenever a predetermined upper level has been reached, there is provided means diagrammatically illustrated at 28 which is responsive to the level of decarbonated coffee in the chamber 21, and which is operative to control the limits of level therein by regulation of the operation of the solenoid valve 15. Such type of regulating equipment is known and does not need to be detailed. The control means 28 does include an upper electrode 29 which is insulatedly supported and which is connected to an electrical connector 30, which is electrically connected to the control 28. The lower level of liquid in the chamber 21 is regulated by a second electrode also electrically connected to the control 28, such second electrode here comprising the dip-stick or tube 24 which thus has this second function.

Electric power is provided for the control 28, and is also provided to an adjustably settable control 31 which has electric connections with the electric heater 23. The control 31 includes a sensing element 32 which is disposed in heat-transfer relation to the means which defines the chamber 21, and which is also disposed in heat-transfer relation to the beverage sensing coil 16. Under standby conditions, the sensing element 32 will periodically call for heat which will be provided to the chamber 21 whenever the control 31 energizes the electric heater 23. When the level control 28 opens the electric solenoid valve 15, lower temperature coffee beverage immediately flows through the sensing coil 16, thereby artificially lowering the temperature of the sensing element 32 to effect energizing of the electric heater 23. Such beverage which initially cooled the sensing element 32 is thereafter admitted to the pre-heating coil 19, sprayed through the nozzle 20, and mixed with the previously discharged beverage. However, in anticipation of the arrival of such lower temperature beverage, the heater 23 is energized. Thus the heat therein is augmented shortly before any actual lowering of the temperature of the ready coffee beverage.

In FIG. 2, there is illustrated an actual embodiment of the heatable decarbonator mechanism 18 shown diagrammatically in FIG. 1. Similar numerals have been employed.

The sensing coil 16, along with the sensing element 32, is embedded in a thermally conductive block 33, such block typically comprising aluminum. The block 33 is in heat-transfer relation to an upwardly opening heatable container 34 which defines the chamber 21 and which is supported by a generally tubular housing 35, the housing 35 being octagonal in cross-section. The container 34 is closed at its upper end by a removable cover 36 which is sealed as at 37 against pressure leakage by a suitable O-ring, and which is detachably clamped at a number of places such as at 38 to hold the same in position.

The cover 36 supports one end of the beverage pre-heating coil 19, and also supports the spray nozzle 20, which in turn supports the other end of the pre-heating coil 19. The spray nozzle 20 may be of a commercially available type. The cover 36 also supports the relief valves 22 and 27, not shown in FIG. 2, and the electrical connector 30. So also, the dual purpose dip tube 24 is insulatedly supported by the cover 36 in radially spaced relation to the spray nozzle 20, being directly in back of it in FIG. 2.

The electric heater 23 is sealably supported by the lower wall of the container 34. The heater is of a commercially available type, its size being selected to correspond to the desired recovery rate of the device. By way of example, to deliver seven or eight cups a minute, a heater of 5000 watts capacity may be employed.

The decarbonator 18 along with the controls 28 and 31 and the valve 15 may be enclosed within a suitably ornamented enclosure indicated in chain lines at 39, the details of which do not form an essential part of this invention.

In FIG. 3, the thermally conductive block 33 is shown in enlarged form. As seen in FIGS. 3–5, the block 33 is secured to the container 34 in heat-transfer relation therewith by any convenient means, here illustrated as being a pair of screws 40, 40 welded to the container 34. The sensing coil 16 is embedded in this block, and the coil preferably comprises stainless steel. The block 33 also has a central cavity 41 within which the thermal sensing element 32 (FIG. 1) is disposed.

It is believed that the operation of the system 10 including the decarbonator 18 is evident from the foregoing description. This apparatus embodies novel process steps in that a substantially constant pressure of carbon dioxide gas is applied to the supply 11 of carbonated coffee. Only a portion of said supply is transferred to the chamber 21 which is maintained at a lesser pressure and at a higher temperature. The temperature of the chamber is sensed and maintained, and in addition thereto, the temperature of the freshly transferred portion is sensed as it is being transferred to the chamber to effect addition of further heat thereto. Thus, the incoming beverage is used to temporarily lower the temperature of the thermal sensing element while it is enroute to the chamber so as to simulate temporarily a lowered chamber temperature in anticipation of an imminent requirement for heat brought about by the addition of the lower temperature liquid, and brought about by the reduction of pressure and increase of volume of the carbon dioxide gas which passes through the spray nozzle. Further, each portion of beverage that is to replenish the supply of decarbonated coffee beverage is raised in temperature to closely match the ready supply by passing it through a heat conductive coil, such as of stainless steel and indicated at 19, through such beverage. This preheating also serves to aid in the separation of the carbon dioxide gas from the liquid.

Although various minor modifications might be suggested by those versed in the art, it should be understood that we wish to embody within the scope of the patent warranted hereon all such embodiments as reasonably and properly come within the scope of our contribution to the art.

We claim:

1. In a process for dispensing decarbonated coffee from a heated depressurization beverage chamber connected by a discharge device within such chamber to a nonheated pressurized remote supply of carbonated coffee beverage, the step of using heated decarbonated beverage to preheat carbonated beverage, which is isolated by a preheating coil, while said carbonated beverage is enroute to said chamber.

2. Apparatus for dispensing coffee from a pressurized supply of carbonated coffee beverage, comprising:

(a) means defining a heatable chamber from which coffee beverage may be withdrawn;
(b) a beverage preheating coil disposed in said chamber to be immersed in coffee beverage therein;
(c) a spray nozzle disposed at the upper end of said chamber and connected to one end of said preheating coil;
(d) a sensing coil disposed outside of said chamber and connected to the other end of said preheating coil, and adapted to be connected to the pressurized supply of beverage; and
(e) means having a sensing element disposed in heat-transfer relation to both said chamber-defining means and said sensing coil, and operative to regulate the amount of heat applied to said chamber-defining means.

3. Apparatus for dispensing coffee from a supply of carbonated coffee beverage, comprising:
(a) a generally tubular housing:
(b) an upwardly opening heatable container supported by and within said housing in radially spaced relation thereto, said container defining a chamber from which coffee beverage may be withdrawn;
(c) thermal insulation disposed between said housing and said container;
(d) a removable cover closing the upper end of said container;
(e) a sensing coil adapted at one end to be connected to the supply of beverage and disposed between said housing and said container;
(f) means supported by said cover and connected to the other end of said sensing coil, and operative on such beverage to decarbonate it and to transfer it to said chamber; and
(g) means having a sensing element disposed in heat-transfer relation to both said container and said sensing coil, and operative to regulate the amount of heat applied to said container.

4. Apparatus for dispensing coffee from a supply of carbonated coffee beverage, comprising:
(a) means defining a heatable beverage chamber from which coffee beverage may be withdrawn;
(b) a preheating means including a coil disposed in said beverage chamber to be immersed in coffee beverage therein, one end of said coil being adapted to be connected to said supply, and the other end of said coil being arranged to discharge carbonated coffee into the upper end of said chamber;
(c) means for transferring heat to coffee beverage in said chamber independently of a preheating means; and
(d) means for intermittently withdrawing decarbonated coffee beverage from said chamber.

5. Apparatus for dispensing coffee from a pressurized supply of carbonated coffee beverage, comprising:
(a) means defining a heatable beverage chamber from which coffee beverage may be withdrawn;
(b) a preheating means including a coil disposed in said beverage chamber to be immersed in coffee beverage therein, one end of said coil being adapted to be connected to said supply, and the other end of said coil terminating at the upper end of said beverage chamber;
(c) a spray nozzle connected to said other end of said coil;
(d) means for transferring heat to coffee beverage in said chamber independently of a preheating means; and
(e) means for intermittently withdrawing decarbonated coffee beverage from said chamber.

6. Apparatus for dispensing coffee from a supply of carbonated coffee beverage, comprising:
(a) an upwardly opening heatable container defining a chamber from which coffee beverage may be withdrawn;
(b) a removable cover closing the upper end of said container;
(c) preheating means adapted to be connected to the supply of carbonated coffee beverage;
(d) a spray nozzle supported by said removable cover and connected to said preheating means and operative on such beverage to decarbonate it and to transfer it to said chamber;
(e) means for transferring heat to coffee beverage in said chamber independently of a preheating means; and
(f) means for intermittently withdrawing decarbonated coffee beverage from said chamber.

7. Apparatus for dispensing coffee from a nonheated pressurized remote supply of carbonated coffee beverage, comprising:
(a) an upwardly opening container having a removable cover and defining a normally closed depressurization and dispensing chamber;
(b) a spray nozzle disposed within said chamber and supported by said removable cover;
(c) an electric heater of the liquid immersion type disposed for heating liquid in said chamber; and
(d) a beverage preheating coil adapted to be connected at one end to said nozzle and at the other end to the nonheated pressurized remote supply of carbonated coffee, and disposed to be heated by the liquid in which said electric heater is immersed for preheating the carbonated beverage to the same temperature as the decarbonated beverage has in said chamber prior to its being mixed therewith.

References Cited
UNITED STATES PATENTS

| | | | |
|---|---|---|---|
| 2,673,920 | 3/1954 | Donovan et al. | 219—302 |
| 2,894,109 | 7/1959 | Kendon | 219—296 |
| 3,068,812 | 12/1962 | Hemeon | 55—69 |
| 3,122,014 | 2/1964 | Dobbins | 55—386 |
| 3,261,507 | 7/1966 | Cornelius | 222—146 |

SAMIH N. ZAHARNA, *Primary Examiner.*

REUBEN FRIEDMAN, *Examiner.*

C. N. HART, *Assistant Examiner.*